(12) United States Patent
Volker

(10) Patent No.: US 9,011,682 B2
(45) Date of Patent: Apr. 21, 2015

(54) REVERSE OSMOSIS DEVICE

(76) Inventor: Manfred Volker, Blankenbach (DE)

( * ) Notice: Subject to any disclaimer, the term of this patent is extended or adjusted under 35 U.S.C. 154(b) by 341 days.

(21) Appl. No.: 13/206,624

(22) Filed: Aug. 10, 2011

(65) Prior Publication Data

US 2012/0048790 A1    Mar. 1, 2012

(30) Foreign Application Priority Data

Aug. 27, 2010  (DE) .......................... 10 2010 035 680
Oct. 15, 2010  (DE) .......................... 10 2010 048 616

(51) Int. Cl.
*C02F 9/00* (2006.01)
*C02F 1/44* (2006.01)
(Continued)

(52) U.S. Cl.
CPC . *C02F 9/00* (2013.01); *C02F 1/008* (2013.01); *C02F 1/36* (2013.01); *C02F 1/385* (2013.01); *C02F 1/441* (2013.01); *C02F 1/4602* (2013.01); *C02F 1/4672* (2013.01); *C02F 1/48* (2013.01); *C02F 1/481* (2013.01); *C02F 1/484* (2013.01); *C02F 1/485* (2013.01); *C02F 2001/46133* (2013.01); *C02F 2001/46152* (2013.01); *C02F 2103/026* (2013.01); *C02F 2103/04* (2013.01); *C02F 2201/003* (2013.01);
(Continued)

(58) Field of Classification Search
CPC .............. C02F 9/00; C02F 1/008; C02F 1/36; C02F 1/385; C02F 1/44; C02F 1/441; C02F 1/4602; C02F 1/4672; C02F 1/481; C02F 1/484; C02F 1/485; C02F 2001/46133; C02F 2001/46152; C02F 2201/003; C02F 2201/46115; C02F 2201/46175; C02F 2103/026; C02F 2103/04; C02F 2303/04; C02F 2303/10; C02F 2303/16; C02F 2303/20; C02F 2209/04; C02F 2209/11; B01D 61/02; B01D 61/025; B01D 61/08; B01D 61/10; B01D 61/12; B01D 61/58; B01D 2311/06; B01D 2311/08; B01D 2311/243; B01D 2311/25; B01D 2311/2603; B01D 2311/2607; B01D 2311/2684; B01D 2311/2676
See application file for complete search history.

(56) References Cited

U.S. PATENT DOCUMENTS 6,063,267 A  *  5/2000  Crewson et al. .............. 210/143
6,936,172 B2 *  8/2005  Hebert .......................... 210/652
(Continued)

FOREIGN PATENT DOCUMENTS

DE          3041209        5/1982
DE          4030913        4/1992
(Continued)

OTHER PUBLICATIONS

Search Report from Corresponding EP Application (11005886), Dec. 8, 2011.
(Continued)

*Primary Examiner* — David C Mellon
(74) *Attorney, Agent, or Firm* — Greer, Burns & Crain, Ltd.

(57) ABSTRACT

The device for producing ultrapure water according to the reverse osmosis principle, comprising a reverse osmosis filter which is subdivided by the RO membrane into a primary circuit and into a secondary circuit, and a pump for the primary circuit, and a flow resistance valve required downstream of the RO membrane for pressure build-up in the primary circuit is characterized in that at least one cleaning chamber with decalcifying ability and a discharge valve are located in the primary circuit and that the flow in the primary circuit is adjustable via a valve.

9 Claims, 2 Drawing Sheets

(51) Int. Cl.
  *C02F 1/48*   (2006.01)
  *C02F 1/38*   (2006.01)
  *C02F 103/04*   (2006.01)
  *C02F 1/00*   (2006.01)
  *C02F 1/36*   (2006.01)
  *C02F 1/46*   (2006.01)
  *C02F 1/467*   (2006.01)
  *C02F 1/461*   (2006.01)
  *C02F 103/02*   (2006.01)

(52) U.S. Cl.
  CPC ............... *C02F 2201/46115* (2013.01); *C02F 2201/46175* (2013.01); *C02F 2209/008* (2013.01); *C02F 2209/04* (2013.01); *C02F 2209/11* (2013.01); *C02F 2301/026* (2013.01); *C02F 2301/046* (2013.01); *C02F 2303/04* (2013.01); *C02F 2303/10* (2013.01); *C02F 2303/16* (2013.01); *C02F 2303/20* (2013.01); *C02F 2303/22* (2013.01)

(56) References Cited

U.S. PATENT DOCUMENTS

| | | | |
|---|---|---|---|
| 7,569,142 B2 * | 8/2009 | Lane | 210/223 |
| 2004/0055955 A1 | 3/2004 | Davis | |
| 2007/0295665 A1 * | 12/2007 | Ayala et al. | 210/670 |
| 2008/0164209 A1 | 7/2008 | Zacerkowny et al. | |

FOREIGN PATENT DOCUMENTS

| | | |
|---|---|---|
| DE | 4222586 | 7/1993 |
| DE | 10112719 | 10/2002 |
| DE | 102008036899 | 2/2010 |
| EP | 1431250 A2 | 6/2004 |
| EP | 1614437 B1 | 1/2006 |

OTHER PUBLICATIONS

Reference list from first Office Action in corresponding DE application, Mar. 15, 2012.

* cited by examiner

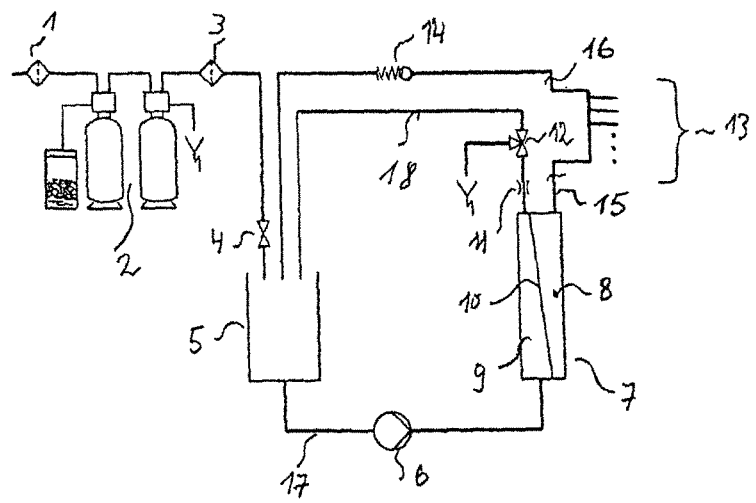
Fig.-1-    (Prior Art)
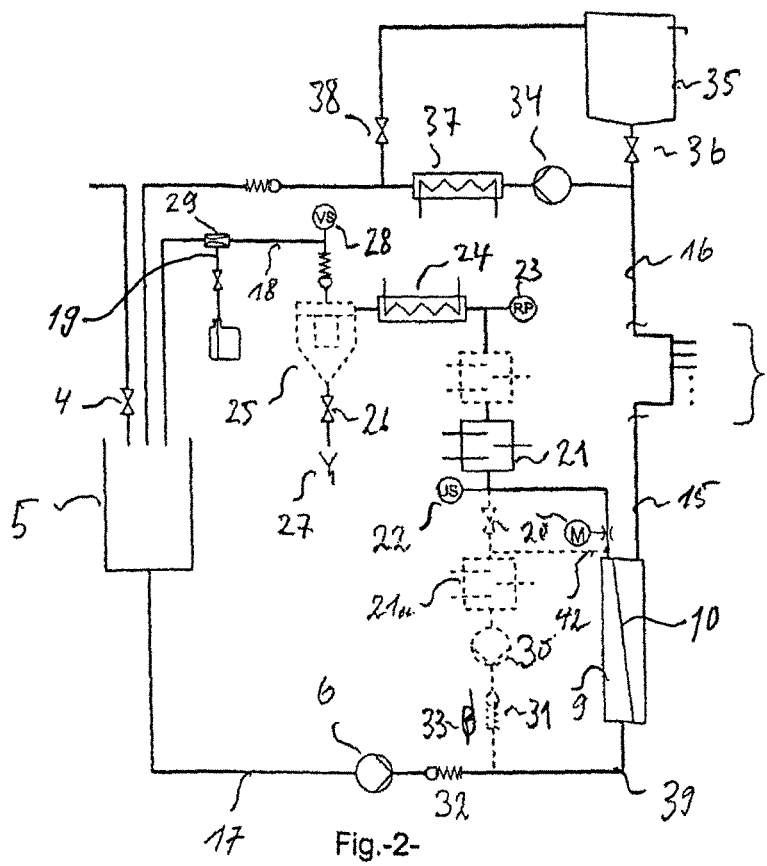
Fig.-2-

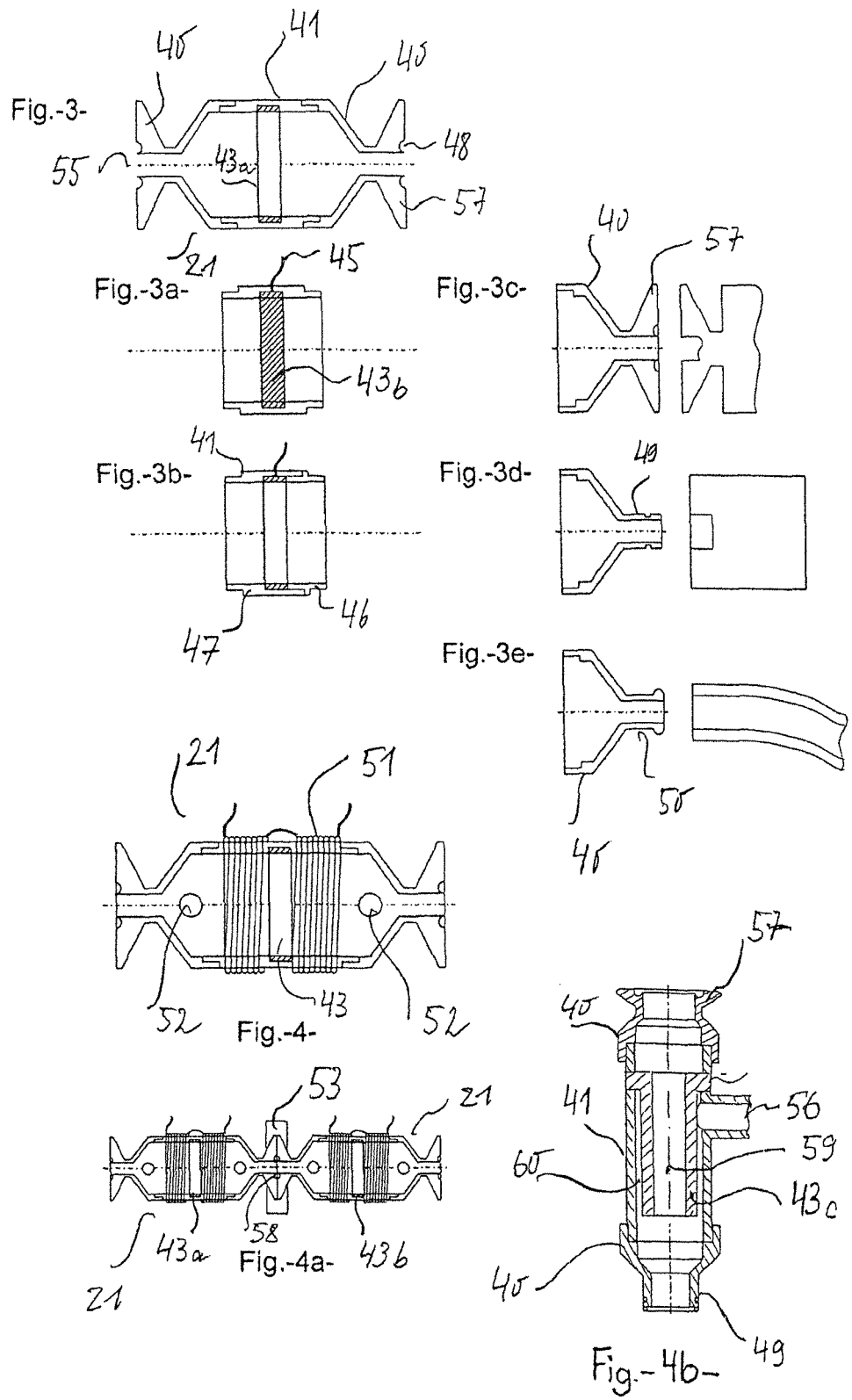

REVERSE OSMOSIS DEVICE

FIELD OF THE INVENTION

The present invention refers to a device for water treatment according to the reverse osmosis principle. Devices of such types, reverse osmosis (RO) systems, are particularly used in combination with hemodialysis devices to obtain sterile high-purity water from tap water for preparing the dialysis liquid.

SUMMARY OF THE INVENTION

The present invention generally aims at an operation of the reverse osmosis system that is as energy-saving as possible.

This object is achieved by a device for producing ultrapure water according to the reverse osmosis principle, comprising a reverse osmosis filter which is subdivided by a RO membrane into a primary circuit and into a secondary circuit, and a pump for the primary circuit, and a flow resistance means required downstream of the RO membrane for pressure build-up in the primary circuit, characterized in that at least one cleaning chamber with decalcification means and a discharge valve are located in the primary circuit and that the flow in the primary circuit is adjustable via a valve. Further features and configurations of the invention become apparent from the following description of embodiments taken in conjunction with the figures, of which:

BRIEF DESCRIPTION OF THE DRAWINGS

FIG. 1 shows the scheme of a typical reverse-osmosis system according to the prior art;
FIG. 2 shows the scheme of a comparable reverse-osmosis system with equipment features according to the invention,
FIGS. 3-4 show the scheme of associated means.

DETAILED DESCRIPTION OF PREFERRED EMBODIMENTS

As is generally known, the functional principle of reverse osmosis systems consists in that the water to be treated is guided in a filter module under high pressure along the surface of a semipermeable membrane, with part of the water, the so-called permeate, passing through the membrane and being collected at the other side of the membrane and supplied to the points of consumption. The part of the raw water that does not pass through the membrane and is enriched with retained substances, the so-called concentrate, flows at the end of the flow section of the primary circuit out of the membrane module.

The scheme shown in FIG. 1 illustrates, as a typical example, the cooperation of essential functional elements of a reverse osmosis system according to the prior art. The raw water to be treated flows out of the feeding line 1 and via the valve 4 into a buffer vessel 5 with installed fill level control. The water passes out of this container 5 through the line 17 via the pump 6 into the reverse osmosis filter 7, the primary circuit 9 of which is separated by the semipermeable membrane 10 from the secondary circuit 8. The permeate flows out of the secondary circuit 8 into a ring line 15/16 from which the consumer lines 13 divert. Permeate produced in excess can flow back at the end of the ring line via an inserted pressure-maintaining valve 14 into the vessel 5, the setting of said valve determining the pressure prevailing in the ring line 15/16.

The pressure needed for filtration in the primary circuit of the RO filter 9 is produced by the pump 6 in combination with a flow resistance means 11 which is inserted into the concentrate line 18 downstream of the filter, e.g. in the form of a throttle valve or a pressure valve.

The concentration difference of retained substances between outlet and inlet of the primary circuit 9 is of great importance to the function of the RO filter 7. With an excessively high concentration particularly of calcium and magnesium, there is an increased risk that such fractions exceed a critical limit. Due to the formation of deposits the permeability of the membrane 10 will then decrease and thus the permeate flow, which means that the reverse osmosis filter becomes prematurely useless.

Due to these facts, and in consideration of the raw water quality, the calcium and magnesium salts, in particular, have so far been exchanged with sodium by upstream cation exchanger columns 2. Ion exchangers require comprehensive maintenance and are costly.

A reliable operation of the cation exchanger necessitates sodium chloride and flushing water. Moreover, salt must be added manually at regular intervals. In addition, the salt-containing flushing water contaminates the waste waters.

Reverse osmoses particularly also serve the preparation of sterile water.

The supplied tap-water part that does not pass through the membrane 10 and is enriched with retained chemical water constituents and bacteria forms a biofilm on the inner surfaces of the liquid-conducting system. The depositions of the biofilm can pass through the non-ideal membrane 10 as pyrogens and endotoxins and contaminate the high-purity permeate circuit 15/16.

Therefore, a thermal or chemical disinfection has to be carried out on reverse osmosis systems at regular time intervals.

For this purpose the operation is interrupted and the system is fed with thermal energy or chemical disinfectant.

Due to the considerable risks entailed particularly by chemical disinfection, the work steps have here to be monitored manually. This means a considerable amount of work in general.

It is also the object of the present invention to reduce the operating costs in that on the one hand the chemical ingredients contained in the water, particularly the cations, are not replaced by means of ion exchangers by chlorides and that on the other hand, however, also a chemical or also thermal disinfection, particularly of the RO primary side, is reduced or excluded.

This object is efficiently achieved according to the invention in that in the primary circulation circuit 5/17/9/18 or also in the extended primary circuit 1/4/5/17/9/18 the liquid flowing therethrough, particularly the mixed water or also the inflowing tap water, is influenced by means of an electromagnetic or electric field or the dissociation forces of the electrolysis or the cavitation forces of the ultrasound or also by the combination thereof.

Microorganisms are here either oxidized or hindered to multiply or reduced by electrical pulses.

Water molecules are distinct dipoles. As a consequence, attraction forces that lead to the formation of hydrogen bonds and thus to large water molecule clusters exist between the water molecules. Moreover, a number of physical theories also start from a dipole element of the electrons.

From a formal point of view the physical anti-lime function consists in stabilizing the lime dissolved in water in such a way that on the one hand no large coherent clusters are formed, on the edges of which lime may precipitate due to the high concentration polarization, and on the other hand the electron dipoles of the crystals (salts) are influenced such that so-called seed crystals are formed and have water molecules and further crystals attached to them.

The normally large water molecule clusters with their dipole-like electrical charge are broken up and arrange themselves in such a manner that predominantly ultra-small water molecule clusters are formed.

As shown in FIG. 2, the invention provides for a cleaning chamber 21 in the primary circulation circuit of the reverse osmosis system, the design of which allows and provides for an electrical or magnetic or electromagnetic or electrolytic or sonographic effect or a combination of different physical effects of the liquid flowing therethrough.

Use and place of installation of the cleaning chamber 21 are however not restricted to the described function.

Especially the germicidal effect of the oxygen radicals of an electrolysis cell makes a chemical or thermal disinfection superfluous. No free chlorine should here be formed because the toxic chlorine passes through the membrane and the membrane surface 10 gets damaged.

The microorganisms contained in the liquid are oxidized while passing through the electrolysis cell and are thereby weakened or killed off.

It has been found that microorganisms are also reduced if exposed to strong electrical pulses or electromagnetic fields.

Systematic studies on ultrasonic decalcification prevention or on sonochemical oxidation processes have so far not existed.

However, it has been found after testing that there is both a stabilization of the lime in water and a reduction of microorganisms.

Ultrasound propagates in liquids as a longitudinal wave which is followed in phase-delayed fashion by a pressure wave. Overpressures and negative pressures are produced due to the change between compression and expansion phases. In the compression phase a positive pressure is exerted on the molecules of a liquid. In the expansion phase a negative pressure is exerted, i.e. the molecules are pulled apart.

The processes that take place during implosion are important for the chemical effects of ultrasound. There prevail extreme conditions that permit chemical reactions that do not take place under normal conditions. The processes that take place during implosion are not fully understood, but lead to the desired effects when employed in RO.

Moreover, it is of great advantage to sonographically carry out a degassing of the liquid, particularly of non-dissolved carbonic acid, because it passes through the membrane and helps to increase permeate conductivity.

When ultrasound and electrolysis are combined, a decalcification of the cathodes by ultrasound is of advantage.

Since the disinfection action of the electrolytically produced oxygen radicals as well as the stabilization of the lime crystals in the liquid are only temporary after the cleaning chamber has been switched off, the high-pressure throttle 20 is advantageously opened periodically or at the end of an operating cycle either by motor or, if a fixed flow resistance means is installed, by means of bypass valve with discharge valve 26. This suddenly increases the flow in the primary circulation circuit and the surfaces of the liquid-conducting components are flooded and flushed.

With advantage the depot effect of the oxygen radicals is here determined by measuring the redox potential 23.

Since the effect of the cleaning chamber 21 cannot be determined by the user directly through its physical effect or its effects on crystal formation, a calcification display 28 is provided with great advantage for the primary circuit.

Components or liquid-conducting lines can here be configured with transparent or translucent material to check the calcification visually. This, however, does not allow a qualitative statement on the intensity of the deposition.

Further calcification or contamination, also microbiological contamination, sensors or detectors are electro-optical transmitter/receiver units.

In an advantageous configuration the transmitter/receiver unit is arranged in a plane. The optical transmitter signal is here projected onto an opposite reflecting surface and is reflected from there to the optical receiver.

The preferred solution is a transparent tube section with opposite transmitter/receiver sensors. The quantity of the receiver signal is here a direct function of the degree of soiling.

In hot-cleanable systems with known volumes the soiling on the heating surface can be exploited such that in the case of a soiled heating surface the heat or energy input into the liquid lasts longer and the energy input can here be used as a measure of the soiling degree.

With advantage, citric acid or another acid is sucked in upon a cleaning request by the calcination sensor 28 via the water jet pump 29 and the metal container connection 19 during operation of the pump 6 and is heated by heater 24 to a moderate temperature to kill off the residual bacteria and to remove crystals.

Advantageously, the cleaning action is supported and residual crystals are dissolved if the tank 35 installed in the return line 16 and containing the cold permeate or the permeate stored in hot form by means of heater 37 and pump 34 is used for the exchange of the primary-side liquid of the reverse osmosis. In this process permeate will be fed to the buffer vessel 5 and distributed with the pump 6 until the primary-side volume of the reverse osmosis is exchanged and the membrane surface 10 is stripped off residues. Instead of the tank 35 and the pump 34, it is also possible to use an expansion reservoir by means of elastic membrane or preloaded bellows.

With great advantage, in order to improve the time effect and to enhance the physical effects, an additional circulation pump 30 can be connected to a cleaning chamber 21a between the concentrate outlet 42 and the mixed water inlet 39. This may be an additional cleaning chamber with a different physical effect with respect to the cleaning chamber 21.

The flow through the primary circuit in the sense of an optimal overflowing of the membrane 10 is here ensured, namely substantially independently of the action of the pump 6 used for the mixed-water supply, the pressure build-up and the circulation performance.

A further essential advantage lies in the fact that the arrangement shown in FIG. 2 saves energy in addition and to a considerable degree. Since the pump 6 only conveys permeate and discharge volume and has no circulation function, its electrical connected load can be reduced to about one third.

For monitoring safe pump operation a magnetic flow monitor 33 is advantageously coupled with the check valves 31/32.

To remove substance residues, another inventive feature is that the liquid of the primary circulation circuit is conveyed by way of a tangential inlet through a cylindrical centrifugal chamber 25 on the upper end of which a turbine blade, which is rotatable by liquid pressure, conveys the substances and particles to be separated downwards and passes the cleaned liquid through a hollow shaft or a strainer-like cylinder upwards.

A collection chamber for the particles or lime clusters to be precipitated is located under the centrifugal chamber 25. The discharge valve 26 may be secured to the collection chamber if a centrifugal chamber is present.

Further configurations of the centrifugal chamber 25 are designs such as e.g. helically downwardly directed spiral liquid guides.

In a further advantageous configuration the centrifugal chamber 25 without turbine blade can be combined with the cleaning chamber 21 as a unit.

The places of installation of the components shown in FIG. 2 are however not restricted to the described site, but first of all serve as an overview.

With great advantage it is also suggested that the power output stages for the control of the cleaning chamber should be configured such that they are adjustable with respect to frequency and current and should be controlled and monitored for malfunction by the processor of the reverse osmosis system. A specific bit pattern can here be output as a test signal and monitored by means of a watch dog, the respective operating status as well as the signal shape being displayed via the display device of the reverse osmosis system and stored with memory modules.

The data can be requested at any time by means of an interface e.g. Ethernet connection of the microcontroller of the reverse osmosis system.

All of the relevant sections such as e.g. the feeding line 1 or the line sections 17 and/or 15/16 of the reverse osmosis system or their distribution system should be equipped with a controller and several end stages and cleaning chambers.

Also several cleaning chambers with identical or different chemical effects can be connected in series or in parallel in this case.

Depending on the water quality of the supplied tap water, decalcification and sterilization can be carried out at the same time by arranging or equipping the cleaning chamber in an artful way.

FIG. 3 shows the structure of a cleaning cell 21 with 3 electrodes, the middle electrode 43 being isolated in space and electrically from the two outer electrodes 40. The liquid can here be introduced in a bidirectional way via the flow channel 55 into the cell. Thanks to the large surface distribution of the outer electrode 40 a uniform potential distribution is achieved in the inner electrode chamber. The isolating piece 41 serves as installation space for the inner electrode 43. The cup-shaped outer electrodes 40 have to be equipped with different connectors such as e.g. clamp connection 57, plug nipple connection 59 or hose connection 50.

The inner electrode 43 is inserted as an annular electrode body in the isolating piece 41.

Depending on the application, the material of the outer electrodes 40 consists of special steel, titanium, mixed titanium oxide or sintered carbon.

The inner electrode 43 consists of an oxidation-stable material such as e.g. conductive carbon, mixed titanium oxide, a ceramic mixture of metal oxides, titanium oxide or cobalt.

It is possible through the selection of the material to operate the cell as an electrolysis cell or as an electromagnetic cell or as a cell with electrode connections for current and voltage also capacitively. Preferably, a pole of the electrical supply connections is connected to the bridged outer electrodes 40, and the other pole to the inner electrode.

In an electrolysis cell the inner electrode 43 is here the anode and the outer electrode 40 is the cathode.

FIG. 3a shows the isolating piece 41 with installed inner electrode 43b and its current supply 45. The inner electrode chamber 43b is here filled in such a way that a greater area is obtained for increasing the residence time of the liquid. This electrode is preferably filled with sintered carbon or another carbon-containing material to carry out an anodic decalcification and the preparation of seed crystals, respectively.

FIG. 3b shows a two-part isolating piece 41 with fittings 46/47. The isolating piece parts 41 with their inner electrodes 43 can be cascaded in any desired way and inserted into the outer electrodes 40 such that cells with four or more electrodes are created. The two outer electrodes 40 can here be electrically combined and electrically connected to the different inner electrodes 43a and 43b in such a manner that the inner electrodes 43a/43b obtain separate potentials.

The material of the inner electrode 43a consists of mixed metal oxides and the material of the inner electrode 43b of sintered carbon. An anodic oxidation with oxygen radicals can thereby be achieved with this cell via the inner electrode 43a and the anodic stabilization of the lime via the additional inner electrode 43b.

FIG. 4 shows the design of a combined cleaning chamber with 3 electrodes and a coil winding 51. Decalcification is here carried out via the force lines of the coil-generated magnetic field in the liquid. The use of Teflon-encapsulated ring magnets in the liquid or ring magnets outside the isolating piece 41 instead of the coil winding 51 is possible.

The two outer electrodes 40 are the cathodes and the inner electrode 43 is the anode of an electrolysis cell for forming oxygen radicals for the inactivation of the microorganisms.

The ultrasonic connections 52 serve to receive piezo-ceramic ultrasonic actuators. The sonographic coupling into the liquid is preferably carried out in this case via titanium or titanium oxide of the outer electrodes 40.

Depending on the material equipment and control, this cell can be combined as an electromagnetic cell for decalcification in combination with an electrolysis cell or a sonographic cell via connections 52 or as a capacitive perforation cell via the connections 40/43 for the inactivation of the microorganisms. During operation as a capacitive perforation cell the outer electrodes 40 are electrically combined and are here, together with the inner electrode 43, the capacitor plates.

The end stages controlled by the electronic system of the RO provide the electrodes of the cell with high-frequency pulses or a frequency, pulse, signal shape conforming to the liquid. The combination of electromagnetic, electrolytic and sonographic effects is possible with this cell.

FIG. 4a shows the possibility of combining two cleaning chambers 21 via a clamp connection 53. Liquid sealing is here carried out via a sealing ring 58 inserted into the groove 48. In this case the current supply of the outer electrodes 40 can take place via the clamp connection 53. The combination of the cleaning cells permits the use of the full spectrum and with all of the above-mentioned physical effects on the liquid. The cleaning chambers 21 can here also be operated at different places of the reverse osmosis system with different effects. The clamp connections simultaneously serve the mechanical fastening of the cleaning cells 21 in the reverse osmosis system.

FIG. 4b shows the design of a vertical cleaning chamber 21 in combination with a centrifugal chamber 25. The liquid is here introduced via the connection 51 tangentially into the isolating piece 41 and conveyed via the annular gap 60 towards connection 49. The connection 40/49 is the collection chamber for substance residues and simultaneously serves to accommodate and connect the discharge valve 26.

The liquid which is freed of substance residues is here further transported via the inner chamber 59 of the tubular inner electrode (anode) 43c via connection 40/57. The two outer electrodes 40 are here combined and form, together with the tubular inner electrode 43c, an electrolysis or perforation or electromagnetic cleaning cell. This form of the cleaning chamber is advantageously also inserted into the feeding line 1.

It is also possible to insert a diaphragm into the interior of the cleaning chamber, the diaphragm retaining toxic water ingredients in a selective way and without residue. Structure and arrangement are however not restricted to the described functions and devices.

A special variant of a cleaning cell (not shown) is based on the measure that outer and inner electrodes are separated by a porous wall of a diaphragm. Here, the diaphragm is only permeable to special ions and ensures that e.g. toxic substances remain in the anode chamber and do thus not pass through the membrane, e.g. ion-exchange resin.

Another special variant is the design of a cleaning cell with catalyst for eliminating or reducing the organic chemical residues formed by oxidation, or also hydrogen.

| | |
|---|---|
| 1. | Feeding line with filter |
| 2. | Cation exchanger |
| 3. | Fine filter |
| 4. | Valve |
| 5. | Supply tank |
| 6. | Pump |
| 7. | Reverse osmosis filter |
| 8. | Secondary circuit |
| 9. | Primary circuit |
| 10. | Membrane |
| 11. | Flow resistance |
| 12. | Valve |
| 13. | Consumer connections |
| 14. | Pressure-maintaining valve |
| 15. | Feeding permeate line |
| 16. | Returning permeate line |
| 17. | Suction line |
| 18. | Concentrate line |
| 19. | Metal container connection |
| 20. | Motor-driven flow resistance or bypass valve |
| 21. | Cleaning chamber |
| 22. | Ultrasonic sensor |
| 23. | Redox measurement |
| 24. | Heater |
| 25. | Centrifugal chamber |
| 26. | Discharge valve |
| 27. | Discharge |
| 28. | Calcination sensor |
| 29. | Pump |
| 30. | Circulation pump |
| 31. | Decoupling valve |
| 32. | Decoupling valve |
| 33. | Reed contact |
| 34. | Heating pump |
| 35. | Hot-water treatment |
| 36. | Tank valve |
| 37. | Heater |
| 38. | Tank valve |
| 39. | Mixed water inlet |
| 40. | Cathode connections (current supplies) |
| 41. | Isolating piece |
| 42. | Concentrate outlet |
| 43. | Anode connection (middle electrode) |
| 44. | Filled anode chamber |
| 45. | Current supply anode (middle electrode) |
| 46. | Isolating piece 1 |
| 47. | Isolating piece 2 |
| 48. | Sealing ring seat |
| 49. | Plug nipple connection |
| 50. | Hose connection spout |
| 51. | Coil winding |
| 52. | Ultrasonic connections |
| 53. | Clamp connection |
| 54. | |
| 55. | Flow channel |
| 56. | Lateral connection |
| 57. | Clamp connection |
| 58. | Seal |
| 59. | Tubular inner electrode |
| 60. | Annular gap |

The invention claimed is:

1. A device for producing ultrapure water according to the reverse osmosis principle, comprising a reverse osmosis filter which is subdivided by a reverse osmosis membrane (RO membrane) into a primary circuit and into a secondary circuit, a pump upstream of the RO membrane and downstream of a buffer vessel having multiple inlets and an outlet wherein fluid exiting the buffer vessel can enter the pump before entering the RO membrane, a flow resistance valve in the primary circuit downstream of the RO membrane for pressure build-up in the RO membrane wherein fluid exiting the RO membrane can enter the flow resistance valve before entering the buffer vessel, at least one cleaning chamber with decalcification means downstream of the flow resistance valve and a centrifugal chamber downstream of the least one cleaning chamber and upstream of the buffer vessel wherein fluid exiting the flow resistance valve can enter the cleaning chamber and the centrifugal chamber before entering the buffer vessel, the centrifugal chamber having a bottom connected to a discharge valve, wherein the flow resistance valve can be opened by a motor to flush the surfaces of the liquid-conducting components.

2. The device according to claim 1, wherein the cleaning chamber comprises capacitive and/or electromagnetic means.

3. The device according to claim 1, wherein a partial stream of the primary circuit circulates via a circulation pump only through the membrane and a second said cleaning chamber.

4. The device according to claim 1, wherein the cleaning chamber has three electrode connections.

5. The device according to claim 1, wherein the cleaning chamber is provided with a coil for producing a magnetic field.

6. The device according to claim 1, wherein the at least one cleaning chamber comprises two or more cleaning chambers connected in series or in parallel.

7. The device according to claim 1, wherein the primary circuit includes an optical or opto-electrical calcification sensor.

8. A device for producing ultrapure water according to the reverse osmosis principle, comprising a reverse osmosis filter which is subdivided by a reverse osmosis membrane (RO membrane) into a primary circuit and into a secondary circuit, a pump upstream of the RO membrane and downstream of a buffer vessel having multiple inlets and an outlet wherein fluid exiting the buffer vessel can enter the pump before entering the RO membrane, a flow resistance valve in the primary circuit downstream of the RO membrane for pressure build-up in the RO membrane wherein fluid exiting the RO membrane can enter the flow resistance valve before entering the buffer vessel, at least one cleaning chamber with decalcification means downstream of the flow resistance valve and a centrifugal chamber downstream of the least one cleaning chamber and upstream of the buffer vessel wherein fluid exiting the flow resistance valve can enter the cleaning chamber and the centrifugal chamber before entering the buffer vessel, the centrifugal chamber having a bottom connected to a discharge valve, wherein the flow resistance valve has a fixed flow resistance and comprises a bypass valve that can be opened to flush the surfaces of the liquid-conducting components.

9. The device according to claim 8, wherein the primary circuit can be flooded and flushed by opening one or both of the discharge and bypass valves.

\* \* \* \* \*